US007707623B2

(12) United States Patent
Cicchitto et al.

(10) Patent No.: US 7,707,623 B2
(45) Date of Patent: Apr. 27, 2010

(54) SELF-SERVICE RESOURCE PROVISIONING HAVING COLLABORATIVE COMPLIANCE ENFORCEMENT

(75) Inventors: Nelson A. Cicchitto, San Ramon, CA (US); Scott L. Chiou, San Mateo, CA (US); Billy J. Barron, Plano, TX (US)

(73) Assignee: Avatier Corporation, San Ramon, CA (US)

( * ) Notice: Subject to any disclaimer, the term of this patent is extended or adjusted under 35 U.S.C. 154(b) by 0 days.

(21) Appl. No.: 11/552,259

(22) Filed: Oct. 24, 2006

(65) Prior Publication Data

US 2008/0098484 A1    Apr. 24, 2008

(51) Int. Cl.
*H04L 21/00* (2006.01)
(52) U.S. Cl. .......................................... 726/4
(58) Field of Classification Search ....................... 726/4
See application file for complete search history.

(56) References Cited

U.S. PATENT DOCUMENTS

| | | |
|---|---|---|
| 6,292,838 B1 | 9/2001 | Nelson |
| 6,546,392 B1 | 4/2003 | Bahlmann |
| 6,671,695 B2 | 12/2003 | McFadden |
| 6,947,989 B2 * | 9/2005 | Gullotta et al. ............. 709/226 |
| 7,031,962 B2 * | 4/2006 | Moses ........................... 707/9 |

(Continued)

FOREIGN PATENT DOCUMENTS

WO          WO0114989          3/2001

(Continued)

OTHER PUBLICATIONS

PCT International Search Report and Written Opinion of the International Searching Authority, issued Jul. 18, 2008, application No. PCT/US07/82444.

(Continued)

*Primary Examiner*—Andrew L Nalven
(74) *Attorney, Agent, or Firm*—Edward J. Radio; Glenn Patent Group (57) ABSTRACT

Exemplary embodiments provide a method and system for self-service resource provisioning having collaborative compliance enforcement. Method and system aspects of the exemplary embodiments include displaying a hierarchical list of resources for selection of at least one privilege associated with the resources; in response to a user selecting least one of the privileges from the hierarchical list, adding the selected privilege to a request cart to enable the user to initiate a request for the privilege; and in response to a user submitting the request cart, automatically invoking a workflow process to approve a request for the privilege, wherein the workflow is dynamically generated at least in part from the structure of the hierarchical list of resources and a location of the privilege within the hierarchical list.

43 Claims, 8 Drawing Sheets

U.S. PATENT DOCUMENTS

| | | | |
|---|---|---|---|
| 2001/0047485 A1 | 11/2001 | Brown et al. | |
| 2002/0188458 A1 | 12/2002 | Babbrah | |
| 2003/0055652 A1 | 3/2003 | Nichols et al. | |
| 2003/0078816 A1* | 4/2003 | Filep | 705/4 |
| 2003/0110246 A1 | 6/2003 | Byrne et al. | |
| 2004/0039594 A1 | 2/2004 | Narasimhan et al. | |
| 2004/0054933 A1 | 3/2004 | Wong et al. | |
| 2005/0108526 A1 | 5/2005 | Robertson | |
| 2005/0137920 A1 | 6/2005 | O'Connor et al. | |
| 2005/0138031 A1 | 6/2005 | Wefers | |
| 2005/0138074 A1 | 6/2005 | O'Connor et al. | |
| 2005/0197952 A1 | 9/2005 | Shea et al. | |
| 2005/0246292 A1 | 11/2005 | Sarcanin | |
| 2005/0262362 A1 | 11/2005 | Patrick et al. | |
| 2006/0212487 A1 | 9/2006 | Kennis et al. | |
| 2006/0236380 A1 | 10/2006 | Bransom et al. | |

FOREIGN PATENT DOCUMENTS

| | | |
|---|---|---|
| WO | WO2005069823 | 8/2005 |

OTHER PUBLICATIONS

PCT International Search Report and Written Opinion of the International Searching Authority, issued Jun. 12, 2008, application No. PCT/US07/82453.

* cited by examiner

Self-Service Resource Provisioning System
10

Contextual Workflow Process

FIG. 4

```
┌─────────────────────────────────────────────────────┐
│ Assign a privilege identifier to each privilege in the privilege │
│          repository when each privilege is created              │
│                         500                                     │
└─────────────────────────────────────────────────────┘
                            │
                            ▼
┌─────────────────────────────────────────────────────┐
│   In response to the identity enforcer module granting a        │
│    privilege to a target user, store the privilege identifier   │
│  assigned to the privilege in a record for the target user in the│
│              authoritative source domain                        │
│                         502                                     │
└─────────────────────────────────────────────────────┘
                            │
                            ▼
┌─────────────────────────────────────────────────────┐
│   In response to receiving a query of the authoritative source  │
│    domain based on a user ID, retrieve a list of privileges     │
│    granted to the corresponding user based on the privilege     │
│          identifiers associated with the user ID                │
│                         504                                     │
└─────────────────────────────────────────────────────┘
```

FIG. 5

Separation of Duty Detection and Compliance Process

FIG. 6

SELF-SERVICE RESOURCE PROVISIONING HAVING COLLABORATIVE COMPLIANCE ENFORCEMENT

CROSS REFERENCE TO RELATED APPLICATIONS

The present application is related to co-pending patent application U.S. application Ser. No. 11/552,285 entitled "Hybrid Meta-Directory", filed on the same date as the present application and assigned to the same assignee.

BACKGROUND OF THE INVENTION

The business landscape has changed in recent years in that organizations continually attempt to achieve greater worker productivity. As a result people are often required to perform more than one specific job function or role in the organization. However, this need must be tempered by the need for the organization to comply with Sarbanes-Oxley Act of 2002.

The Sarbanes-Oxley Act (SOX) has imposed new requirements on public companies in areas of assessment and oversight of control systems that support external financial disclosures. One of the new requirements is that a company's external auditor, for the first time, must provide an annual opinion on the reliability of the control representation made by a company's CEO and CFO. This has caused companies to struggle to comply with SOX since its enactment.

In many cases, SOX has generated some confusion for corporate officers charged with overseeing compliance. It was initially thought SOX would primarily affect corporate finance departments, but organizations discovered that SOX also affected information technology IT functions. However, traditional audit/compliance approaches and tools used in most companies today are inadequate to meet the virtually "real time" assessment and monitoring expectations imposed by SOX, particularly compliance with §404.

BRIEF SUMMARY OF THE INVENTION

Exemplary embodiments provide a method and system for self-service resource provisioning having collaborative compliance enforcement. Method and system aspects of the exemplary embodiments include displaying a hierarchical list of resources for selection of at least one privilege associated with the resources; in response to a user selecting at least one of the privileges from the hierarchical list, adding the selected privilege to a request cart to enable the user to initiate a request for the privilege; and in response to a user submitting the request cart, automatically invoking a workflow process to approve a request for the privilege, wherein the workflow is dynamically generated at least in part from the structure of the hierarchical list of resources and a location of the privilege within the hierarchical list.

According to the method and system disclosed herein, access to the privileges in the request cart are not automatically granted based on a rule set, but rather each privilege is granted or approved by requiring a chain of approvals from a manager of the target user of the requested privilege, the manager of the requested privilege, and the manager of the resource (and any sub-resource) from which the privilege was selected, as defined by the structure of hierarchical list. By requiring the managerial chain of approvals, the exemplary embodiment provides a collaborative enforcement mechanism for helping organizations maintain compliance with §404 of the Sarbanes-Oxley Act by ensuring that users do not obtain access to resources that they should not have access to.

DETAILED DESCRIPTION OF THE INVENTION

The present invention relates to a self-service resource provisioning method and system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In one aspect of the exemplary embodiment, a system is provided that organizes resources, such as software applications and computer systems, into a tree hierarchy, and organizes individual privileges under the resources. The system enables self-service resource provisioning through an intuitive and easy to use interface that allows the tree hierarchy of resources to be used as a store from which users select the resources and privileges they need for their job functions, and drag and drop the selected resources and privileges into a shopping cart to request the privileges. In response, a contextual workflow approval process is initiated whereby a managerial chain of approval is required to approve the request, thereby providing a collaborative enforcement mechanism for helping organizations maintain compliance with §404 of the Sarbanes-Oxley Act by ensuring that users do not obtain access to resources that they should not have access to.

In a second aspect of the exemplary embodiment, the system utilizes a hybrid meta-directory for recording the grant of privileges to users, which is used to provide a second built-in Sarbanes-Oxley detection and compliance mechanism that reduces the probability that an individual is granted access to a set of privileges that conflicts with the separation of duties according to corporate business practices.

Figure 1:
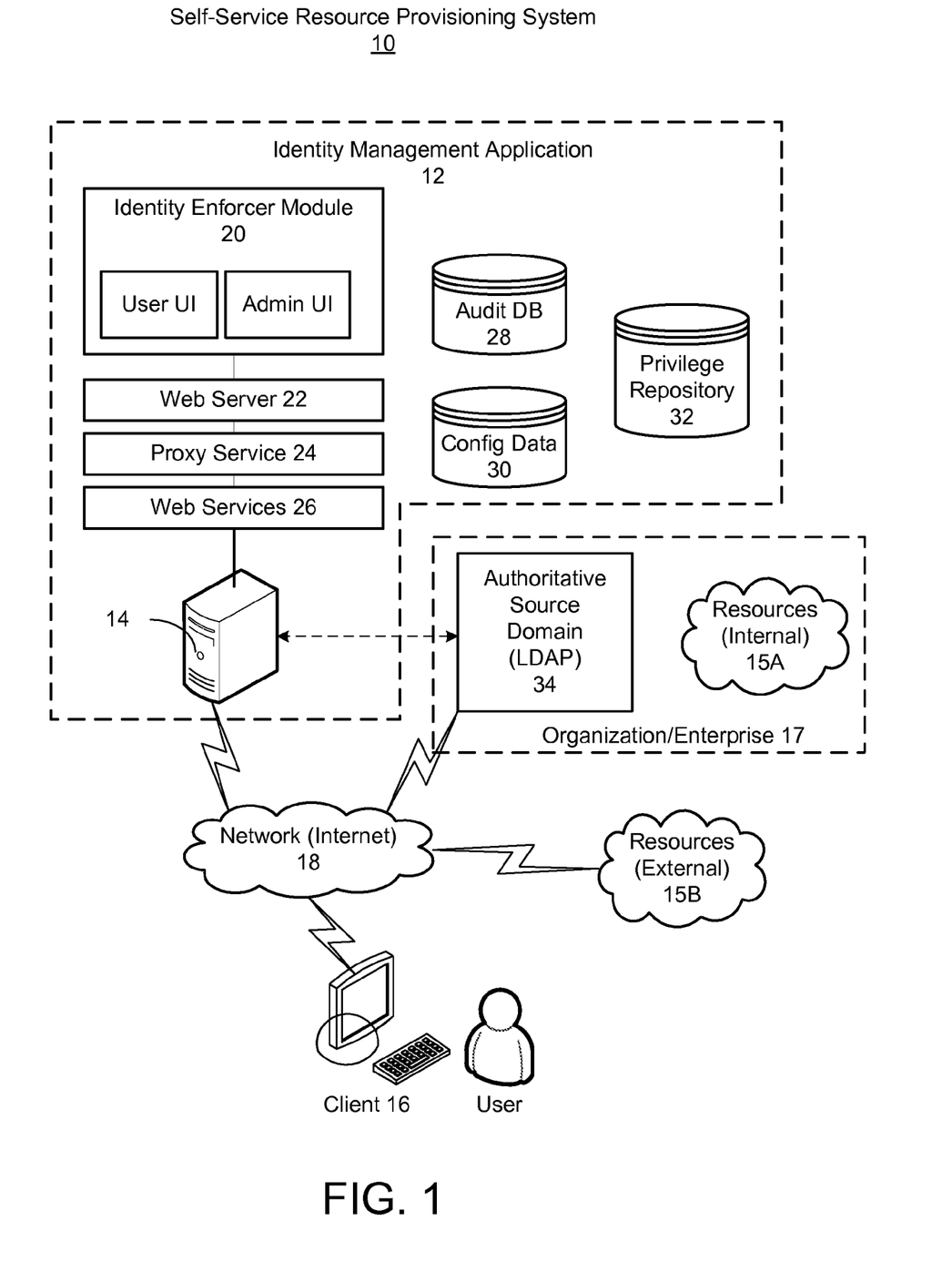
FIG. 1 is a block diagram illustrating a self-service resource provisioning and collaborative compliance enforcement system.

FIG. 1 is a block diagram illustrating a self-service resource provisioning and collaborative compliance enforcement system. The system 10 includes an identity management application 12 hosted on one or more web servers 14 that provides users with self-service resource provisioning of an organization/enterprise's internal resources 15a and/or of resources 15b external to the organization. The internal and external resources 15a and 15b, collectively referred to as resources 15, may include assets and access. Examples of an asset may include hardware and software systems, subsystems, business cards, tools, and so forth, while examples of an access may include privileges or permissions, and roles. Typically, internal resources 15*a* are owned, operated, or controlled by the organization/enterprise 17. The organization/enterprise 17 also preferably includes a network accessible authoritative source domain 34.

In one embodiment, the identity management application 12 may be implemented as an application that is used internally by the organization/enterprise 17. In another embodiment, the identity management application 12 may be implemented as a service that is provided to the organization/enterprise 17 over the network 18 a third party.

Preferably, the user accesses the identity management application 12 via a client 16 over a network 18. In one embodiment, the client 16 comprises a Web browser running on any network capable electronic device, such as a PC, workstation, laptop, or personal digital assistant (PDA), for example. In an alternative embodiment, the client 16 may comprise proprietary software for communicating with the identity management application 12, rather than a browser. The network by which the server(s) 14 hosting the identity management application 12 and the client 16 communicate preferably comprises a public network, such as the Internet, but may also comprise any type of local area network (LAN), wide area network (WAN), or wireless network (WiFi or WiMax).

The identity management application 12 may include a service referred to as the identity enforcer module 20, a software application web server 22, a proxy service 24, and Web service 26. The identity management application 12 has access to several databases/repositories including an audit database 28, a database for configuration data 30, and a self-service privileges repository 32.

The identity enforcer module 20 is the component that enables the user to intuitively request privileges to the organization's resources 15, as explained below. The user logs into the identity management application 14 through the client 16 browser as follows. The username and password entered by the user through the client 16 are received by the web server 22 and passed to the proxy service 24, which together with the authoritative source domain 34 and/or a third party authoritative service (not shown), provide access management. The proxy service 24 and authoritative source domain 34 provide run-time user authentication and authorization services to protected resources 15. The proxy service 24 has administrator rights and is capable of making changes to directories in the authoritative source domain 34.

The authoritative source domain 34 is an authorized origination point or system of record for user identity data attributes. Example of an authoritative source domain 34 is Lightweight Directory Access Protocol, or LDAP ("elldap"), which is a networking protocol for querying and modifying directory services running over TCP/IP. An LDAP directory usually includes a tree of entries, each of which includes a set of named attributes with values. Example types of LDAP directories include Microsoft ACTIVE DIRECTORY (AD), Sun JAVA ONE, Oracle INTERNET DIRECTORY, IBM DIRECTORY SERVER, and Novell EDIRECTORY. Users login through the LDAP, and the LDAP is used to derive the identity of the requesters, target users, and the managers of the target users, and the groups that users need to be assigned to receive the appropriate rights. Once a user is authenticated in the authoritative source domain, the system can determine the manager of the user, if any, and any organizational groups for which the user is included.

The Web server software 20 provides internet services for the identity enforcer module 20, including delivering Web pages to client 16 browser and other files to applications via the HTTP protocol. In addition, the identity management application 14 utilizes web services 26, such as a Java, .NET, or service oriented architecture (SOA), that allows the identity management application 14 to communicate with other systems, such as UNIX, AS/400, and IBM mainframes.

All transactions by all users are preferably recorded and categorized in the audit database 28 in a secure manner for historical purposes. All customization information for the application, e.g., look and feel and behavior, is preferably stored in the configuration data 30 to provide a central location for backup, rather than using multiple register or INI files.

It should be understood that the functionality of the identity management application 14 may be implemented using a greater number or lesser number of software components than those shown in FIG. 1.

Figure 2:
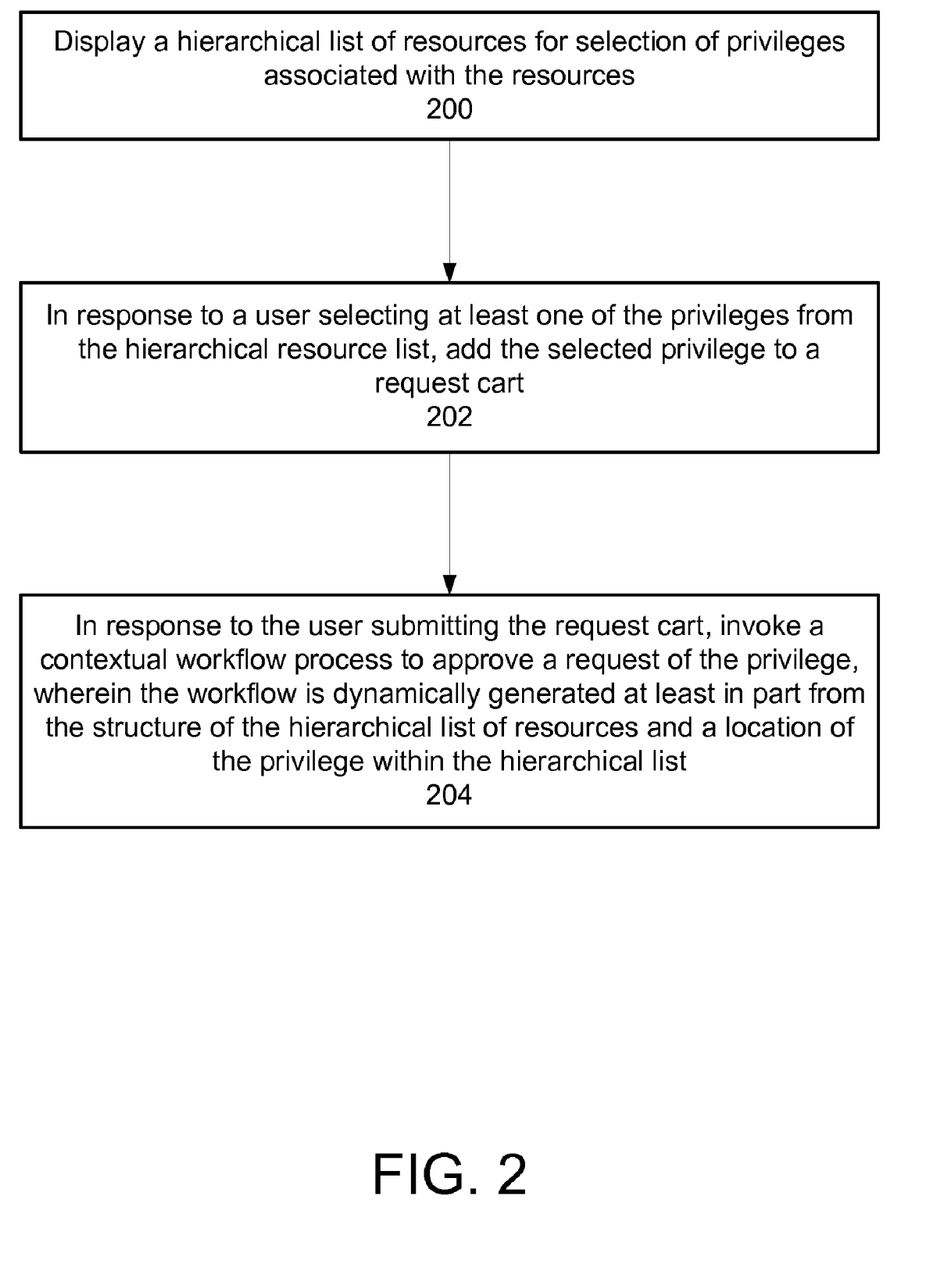
FIG. 2 is a flow diagram illustrating a process for providing self-service resource provisioning having collaborative compliance enforcement.

FIG. 2 is a flow diagram illustrating a process for providing self-service resource provisioning having collaborative compliance enforcement. The process begins in block 200 in which a user accesses the identity enforcer module 20 and the identity enforcer module 20 displays a hierarchical list of resources 15 for user selection of at least one of a plurality of privileges associated with the resources 15.

The organizational resources 15 in the hierarchical resource list 306 are configured by an administrator of the identity enforcer module 20 during a configuration phase and preferably stored in the privilege repository 32 shown in FIG. 1. The resources 15 are retrieved from the privilege repository 32 and displayed on the client 16 once the user logs into the application 12 and accesses the identity enforcer module 20 for self-service provisioning of the resources 15. Resources 15 may contain repositories of IDs, and each ID may have an owner associated with it.

Users of the system may include members of the organization/enterprise, such as officers, employees, and contractors, as well as non-members of the organization/enterprise, such as vendors, customers, and guests. Non-members must enter some form of identification before access is granted.

Figure 3A:
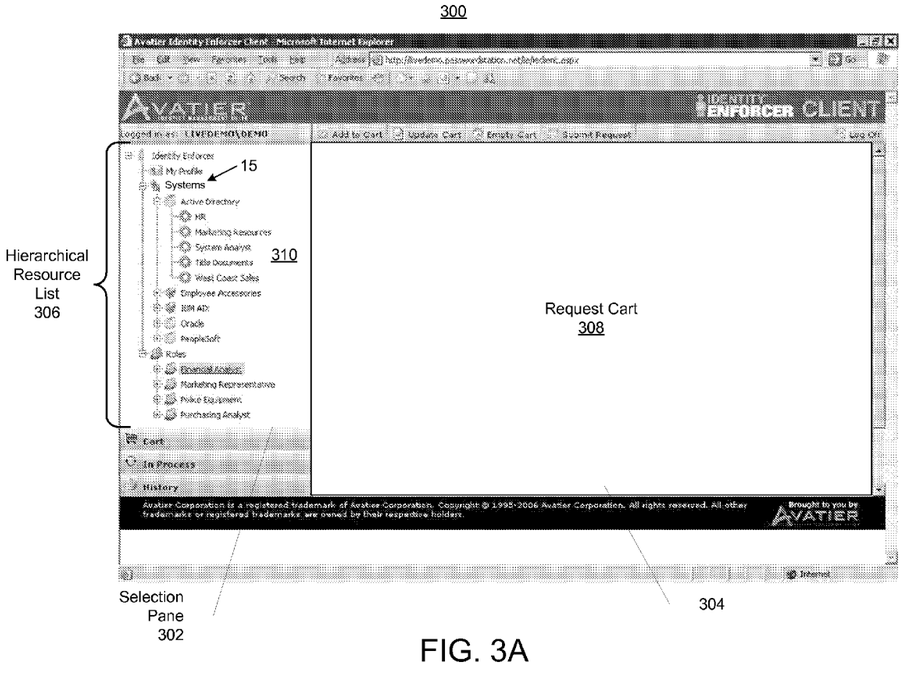
FIGS. 3A, 3B, and 3C are diagrams illustrating example screens displayed by the identity enforcer module to a client for enabling self-service resource provisioning.

FIG. 3A is a diagram illustrating an example screen displayed by the identity enforcer module 20 to the client 16 for enabling self-service resource provisioning. According to the exemplary embodiment, the identity enforcer module 20 provides a graphical user interface (GUI) based on an e-commerce metaphor in which the organizational resources 15 are organized into a "store" that users may select from and add to a request cart. The resources 15 may be analogized to aisles comprising the store, while privileges associated with the resources 15 can be analogized to the items occupying the shelves of the aisles.

The self-service resource provisioning GUI 300 preferably includes a window having two panes, a selection pane 302 and a second pane 304 for displaying a request cart 308. The selection pane 304 is for presenting the "store" of resources 15, which according to the exemplary embodiment, are displayed in a hierarchical resource list 306. The resources 15 in the resource list 306 may include hard and soft resources. Examples of hard resources include servers, computers, networks, business cards, phones, and the like. Examples of soft resources include application/system programs, databases, e-mail and voicemail accounts, files, folders, and the like. Soft resources may also include roles of positions within the organization, e.g., a financial analyst, where each role in the system is considered a collection of privileges. A soft resource may also include user accounts, which the user may select for account creation.

According to the exemplary embodiment, the user may provision or "shop" for resources 15 required to perform a job function by selecting privileges 310 associated with the resources 15. In one respect, a privilege 310 is a permission to perform an action with respect to the associated resource 15. Examples of this type of privilege includes the ability to create a file in a directory, or to read or delete a file, access a device, or have read or write permission to a socket for communicating over the Internet. In another respect, a privilege 310 is a grantable attribute of a resource, such as the resource type and capabilities. For an example of this type of privilege, consider a resource such as a cell phone, for instance, where the privileges associated with the resource might include the type of cell phone, e.g., international or domestic, and the number of minutes in the calling plan, e.g., 1000, 500, unlimited, and the like. Generally, privileges 310 occupy leaf nodes of the resource list 306, but there may be resources 15 in the list 306 that do not explicitly list any privileges 310, in which case the resource 15 may itself represent, or include, default privileges.

By expanding the part of the resource list 306 under a selected resource 15, the privileges 310 associated with that resource 15 are displayed. For example, in the example hierarchical list 306 shown, some of the displayed resources include "Active Directory", "Employee Accessories", "IBM AIX", "Oracle", and "PeopleSoft". The hierarchical list 306 under the "Active Directory" resource 15 has been expanded, showing a level deeper into the list 306. In this example the next level displays example privileges 310 that may be provisioned for the "Active Directory" resource 15, which the are "HR", "Marketing Resources", "System Analyst", "Title Documents", and "West Coast Sales". It should be understood that the hierarchical resource list 306 may include any number of levels of resources, sub-resources, and privileges.

Referring again to FIG. 2, in block 202, in response to a user selecting at least one of the privileges 310 from the hierarchical resource list 306, the selected privilege 310 is added to the request cart 308 to enable the user to initiate a request for the privilege 310. In one embodiment, the user may select privileges 310 by simply "dragging and dropping" the privileges 310 (singularly or as group) into the request cart 308 using any type of computer input devices, such as a keyboard and mouse. Alternatively, the GUI 300 may be provided with a control, such as an "Add to Cart" button, for allowing the user to add a highlighted privilege 310 from the resource list 306 to the request cart 308.

Figure 3B:
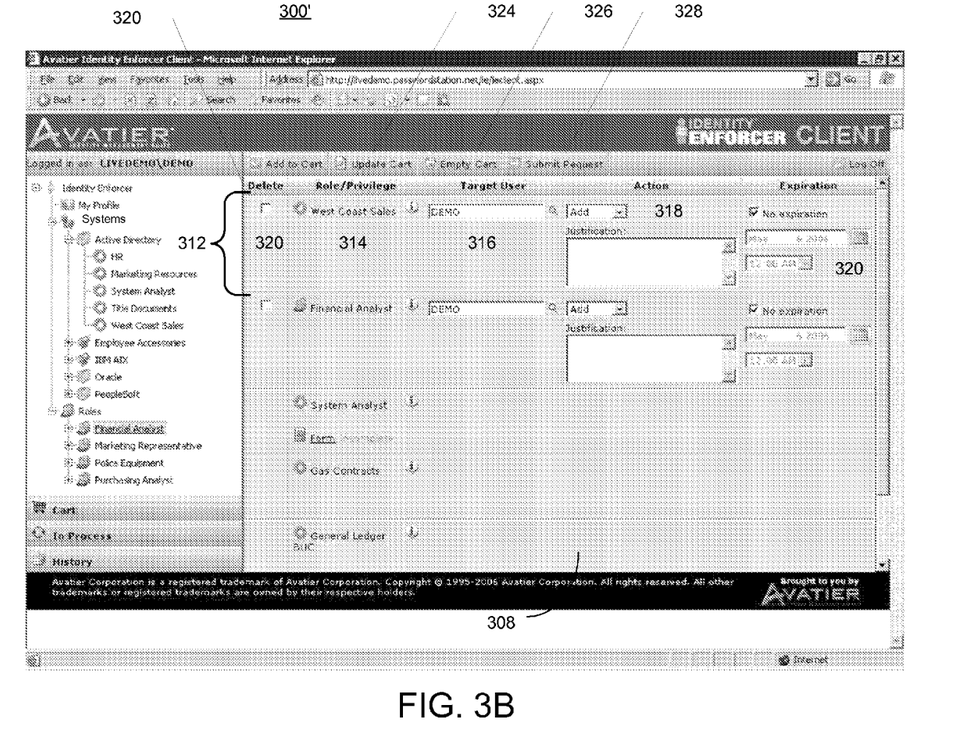

FIG. 3B is a diagram illustrating the example GUI 300' screen displayed by the identity enforcer module 24 on the client 16 after the user has added privileges 310 to the request cart 308. The request cart 308 includes an entry 312 for each privilege 310 in the request cart 308, which in turn, includes a privilege/role name 314, and a target user text box 316 for prompting the user to enter a name of the target user. The user who initiates the request for a privilege 310 is a requester, but the requester makes a request for the privilege 310 on behalf of the designated target user, which may be the requester themselves, or a third party.

The request cart 308 may also include an action control 318 for allowing the user to associate a specified action with the privilege (e.g., to order business cards or to create an account) and/or to enter a justification for requesting the privilege 310; and an expiration control 320 for entering the date and time at which the privilege request expires, if any. The GUI 300' may also include a Delete control 320 for allowing the user to remove a privilege from the request cart 308, an Update Cart button 324 for allowing the user to update the request cart 308, an Empty Cart button 326 for allowing the user to remove all the privileges 312 from the request cart 308, and a Submit Request button 326 for allowing the user to submit the request for the privileges 312 in the request cart 308.

Referring again to FIG. 2, in block 204, in response to the user completing his or her selections and submitting the request cart 308, the identity enforcer module 20 invokes a contextual workflow process to approve the request for the privilege, wherein the workflow is dynamically generated at least in part from the structure of the hierarchical list of resources 306 and a location of the privilege 310 within the hierarchical tree. According to the exemplary embodiment, the contextual workflow provides built-in collaborative compliance enforcement with Sarbanes-Oxley §404, where privileges 312 are not automatically granted based on a rule set, but rather each privilege 312 is granted or approved by requesting approval from a chain of one or more people or entities associated with the privilege 310 and its corresponding resource 15 as defined by the structure of hierarchical list 306.

More specifically, once a request for a privilege 310 from the resource store is submitted for a target user, a contextual workflow is initiated in which requests for approval are sent the target user's manager, as well as the respective managers of the privilege 310 and the resource 15 to which the privilege 310 is linked in the resource list 306. The identity enforcer module 20 then grants or denies the user's request based on the responses received from the managers.

By requiring a chain of approvals from the manager of the target user of the requested privilege 310, the manager of the requested privilege 310, and the manager of the resource 15 (and any sub-resource) from which the privilege 310 was selected, the identity enforcer module 20 provides a managerial collaborative enforcement mechanism for helping organizations/enterprises maintain compliance with §404 of Sarbanes-Oxley.

According to an alternative embodiment, the request for privilege may be initiated by a manager on behalf of a target user. In this case, the identity enforcer module 20 sends a notice to the target user asking the target user if they need or want access to the privilege. If the target user approves the request, then the approval request is sent up the management chain, as described above.

Figure 4:
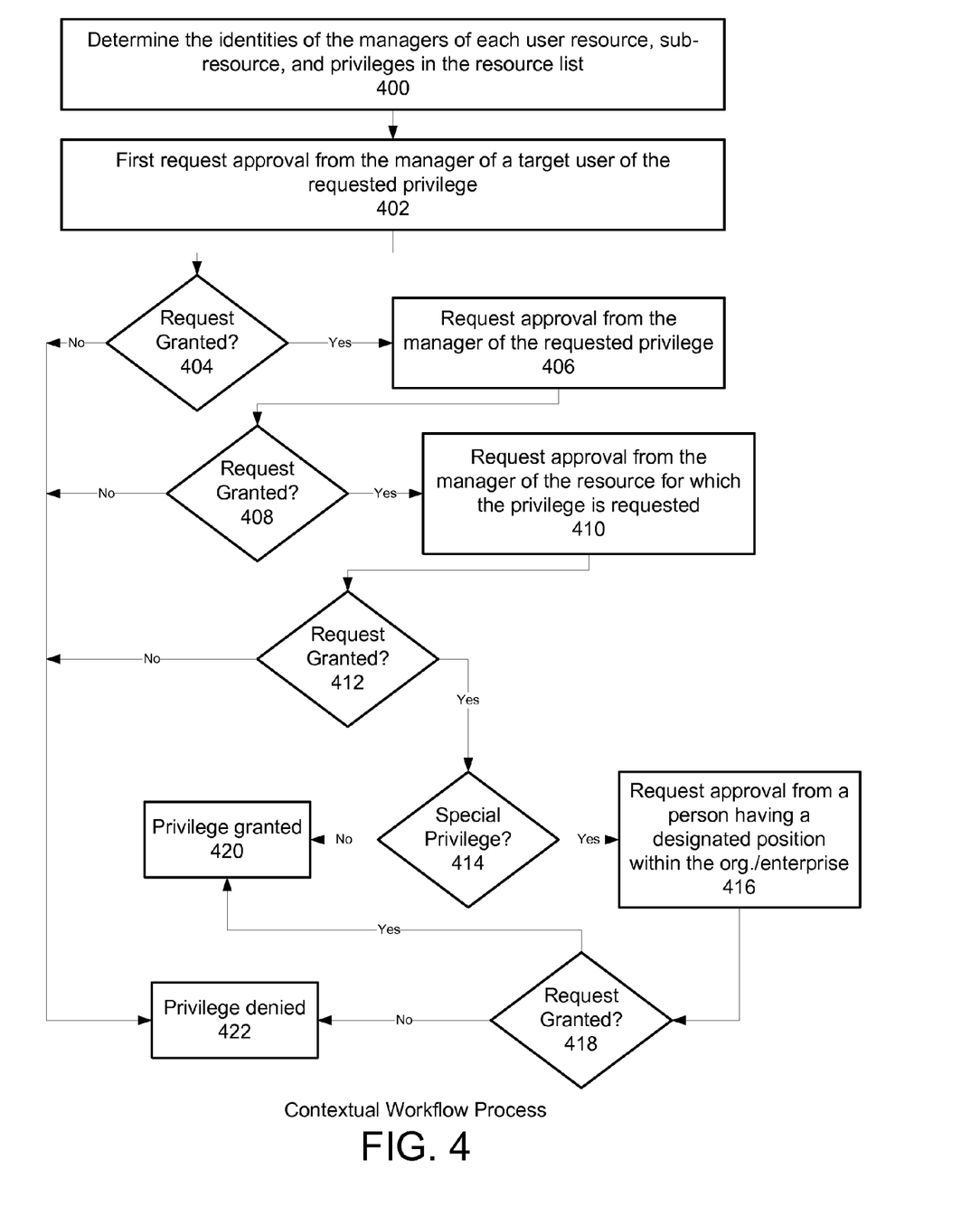
FIG. 4 is a diagram illustrating a contextual workflow process based on the structure of the hierarchical resource list in accordance with the exemplary embodiment.

FIG. 4 is a diagram illustrating a contextual workflow process based on the structure of the hierarchical resource list 306 in accordance with the exemplary embodiment. The process of generating contextual workflows begins with a configuration block in block 400 in which the identities of each owner, administrator, or manager (collectively referred to hereinafter as manager(s)) are determined of each user, resource 15, sub-resource, and privilege 310 in the resource list 306. An organization chart and/or the authoritative source domain 34, for example, may be used to identify the managers of people. In some cases, a manual process may have to be employed to compile a list of the managers of the resources 15 and privileges 310.

Then in block 402, in response to the identity enforcer module 20 receiving a request for privileges 310, e.g., by submittal of the request cart 308, the identity enforcer module 20 initiates the approval request chain whereby for each selected privilege 310, approval is first requested from the manager of a target user of the requested privilege 310.

In block 404, it is determined whether the manager granted the request. If the manger granted the request, then in block 406, approval is requested from the manager of the requested privilege 310. In block 408, it is determined if the manager of the requested privilege 310 granted the request. If so, then in block 410, approval is requested from the manager of the resource 15 for which the privilege 310 is requested. In block 412, it is determined if the manager of the resource 15 granted requests.

It should be understood that not every resource 15 and privilege 310 may have an associated manager. It should also be understood that the approval process can loop, meaning that there may be one or more privilege and resource managers and associated request for approval depending on the level of the resource hierarchy. In addition, a designated approver may be a group rather than an individual, in which case, the workflow process may be configured to require a response to the approval request from anyone from the group, or from all the people in the group.

If all the managers granted the request, then in block 414, it is determined if the privilege is marked special. According the exemplary embodiment, a special privilege is one that requires further approval by a person within a designated position in the organization/enterprise, such an officer or executive. If so, then in block 416, approval is requested from the person having the designated position, e.g., CEO, COO, or CFO associated with granting of the special privilege.

If the privilege is not marked special, and if all the managers granted the request, then in block 420, the requested privilege 310 is granted to the target user. If any of the managers deny the request, then in block 422, the request for the privilege 310 is denied.

According to an exemplary embodiment, the approval workflow associated with each privilege 310 is thus derived from the location of the privilege 310 in the hierarchical list 306, such that if the privilege 310 is moved to a different location in the hierarchical list 306, then the approval workflow is automatically changed. For example, if the privilege is moved in the list 306 from a first resource to a second resource (i.e., moved from aisle #1 in the store to aisle #2), then once the privilege is requested, the approval workflow automatically changes to include a request for approval from the manager of aisle #2, rather than the manager for aisle #1.

In one embodiment, the identity enforcer module 20 sends requests for approvals to the managers using electronic messages, such as e-mail, short messaging service (SMS), voice mail, and the like. The identity enforcer module 20 includes an interface capable of receiving responses from the managers in a like fashion. For example, if the request for the approval is sent via e-mail, the e-mail may include a hyperlink link to a secure approval site. For voice mails, the managers may respond by calling a number and answering voice prompts. Another alternative is to have the request physically printed and routed to the managers, and have the returned results typed into the system.

In one embodiment, the identity enforcer module 20 may serially send each request for approval to the managers based on the hierarchy of the contextual workflow such that a request for approval is not sent out to a manager associated at one level the hierarchy list 306 until a response is received from the manager on the adjacent lower-level of the hierarchy list 306. In another embodiment, the identity enforcer module 20 may send all the requests for approvals to the managers at one time and tabulate the results of the responses once received.

Because the contextual workflow approval process is based on human approval, the process may include inherent delays waiting on responses from the various managers in the chain. According to one embodiment, the workflow process may be configured such that a countdown timer having a designated duration is associated with each privilege 310 in the resource list 306. Once the request for the privilege 310 is submitted, the corresponding workflow process starts the countdown timer. As for the countdown timer begins to expire, the workflow process sends approval request reminders at increasingly rapid intervals to the managers who have yet to respond as an escalation of the workflow. Once the time period expires, an escalation reminder notice may be sent to the approver's manager.

According to the exemplary embodiment, the identity enforcer module 20 also allows the user to view the progress of pending workflow processes that were initiated by the user.

Figure 3C:
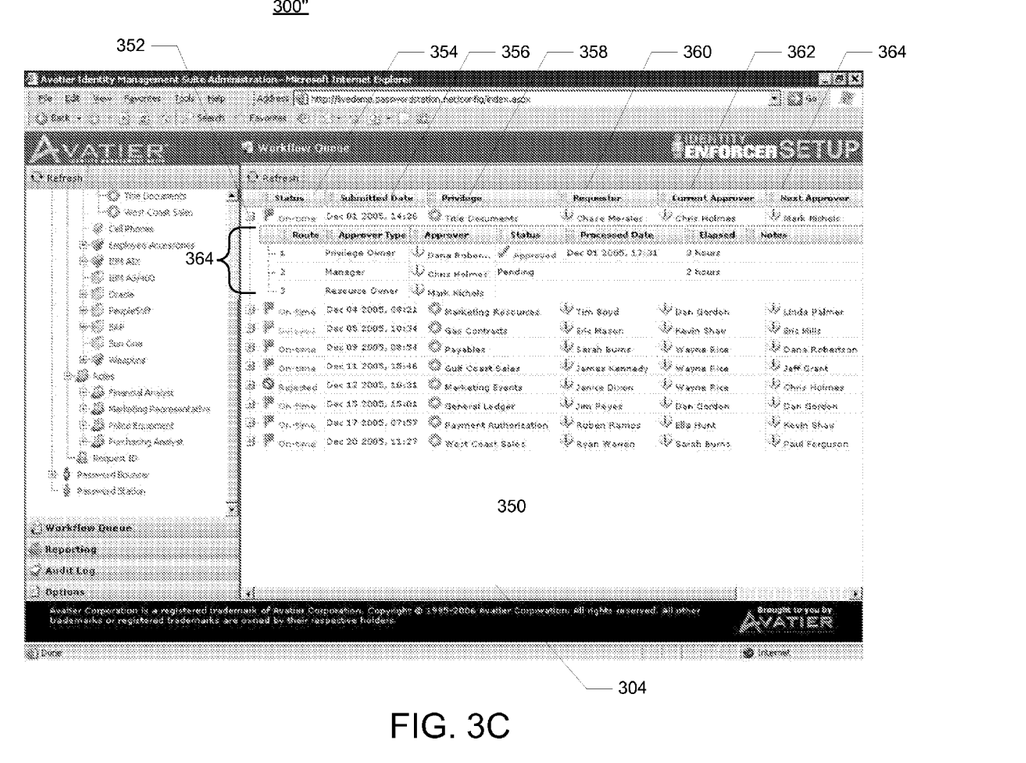

FIG. 3C is a diagram illustrating the example GUI 300" screen displayed by the identity enforcer module 24 on the client 16 in response to a request by the user to view the workflow queue. The workflow queue 350, which may be displayed in pane 304, allows the user to view which privilege requests are in the approval process, when the request was submitted, by whom, and for whom. The workflow queue 350 includes one expandable entry 352 for each workflow process. Each workflow process entry 352 may display information such as the status 354 of the process, e.g. "on time", the submittal date 356, the name of the requested privilege 358, the name of the requester 360, the name of the current approver 362, and the name of the next approver 364.

In response to the user double-clicking on one of the workflow entries 352, the GUI 300" displays a history 364 of the work flow process showing information about each approver in the approval chain and the status of the corresponding approval, including the elapsed time. In one embodiment, each time an approver in the chain approves the request, the identity enforcer module 20 sends an e-mail to the requester and/or the target indicating such.

As stated above, determining whether to grant a user's request for privileges 310 by obtaining a chain of approvals from managers of the requested privileges 310 and associated resources 15 implements self-service resource provisioning in a manner that provides collaborative compliance enforcement of §404 of the Sarbanes-Oxley Act.

According to a second aspect of the exemplary embodiment, the identity enforcer module 20 provides a second built-in Sarbanes-Oxley detection and compliance mechanism that further reduces the probability that an individual is granted access to a set of privileges that conflicts with the separation of duties according to corporate business practices.

Typically, conventional self-provisioning resource systems include a resource database that stores records for resources/privileges that can be granted to users of the system. In response to a user's request for resource, a conventional system would determine whether or not to grant user request based on a set of rules and the user's roles in the organization. Once the system approves a user's request for a resource, the granting of the request for access to the resource is recorded by storing the user's ID in association with a record for the resource in the resource database.

However, storing user IDs in association with each privilege that the user has been granted access to has drawbacks. One drawback is that if the user leaves the organization or if the user's ID changes, then an administrator of the system must search the resource database for multiple occurrences of the user's ID and either delete or modify the user ID, which can be tedious, error-prone, and time-consuming.

Figure 5:
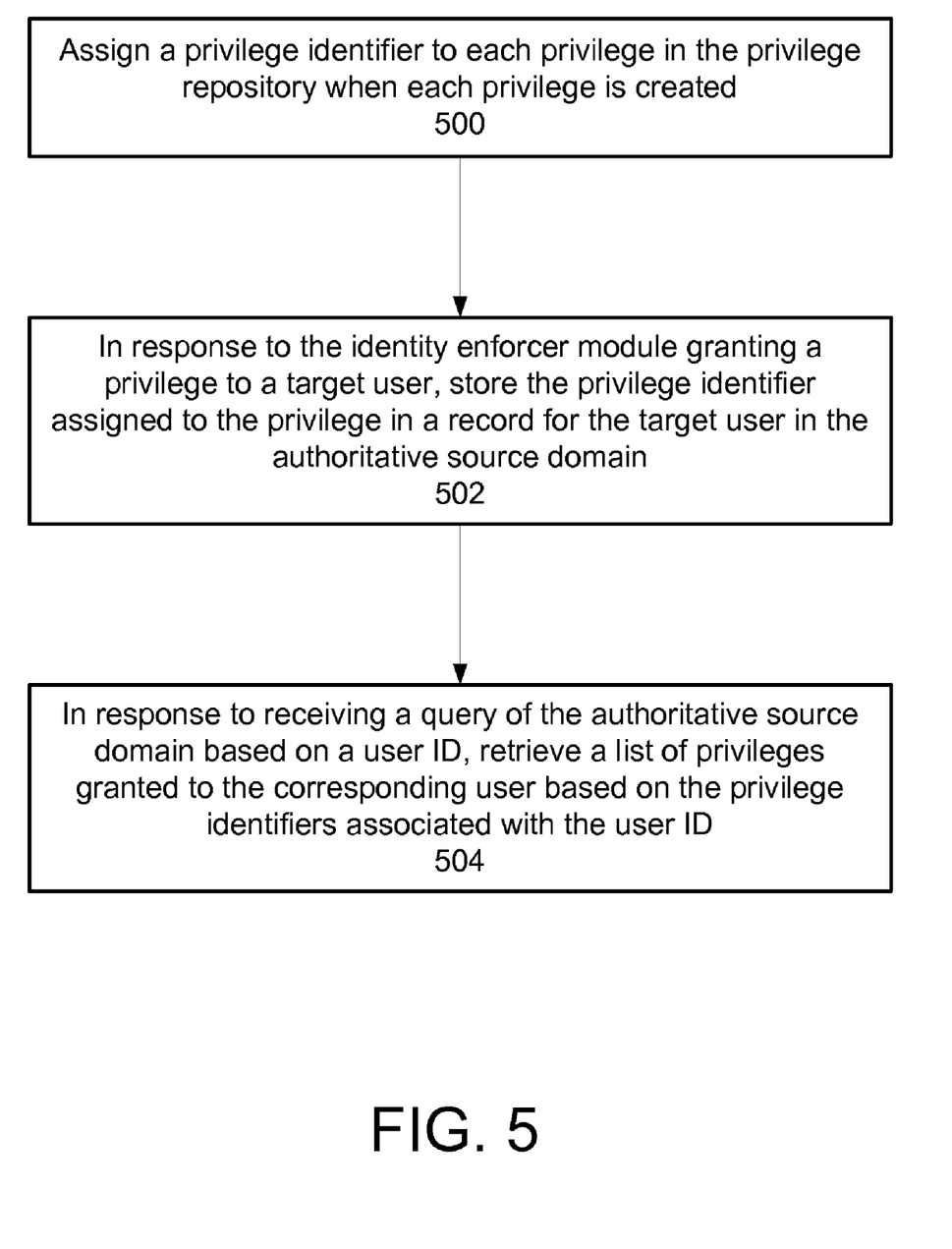
FIG. 5 is a flow diagram illustrating a process for providing a hybrid meta-directory for recording a grant of privileges to users.

According to the exemplary embodiment, the identity management application 12 does not record the granting of privileges to users by storing individual user IDs in association with granted privileges in the same meta-directory where the privileges are stored. Instead, the identity management application 12 implements a hybrid metadata directory for storing granted privilege information in a manner that that leverages existing directories within an organization and that provides the benefits of a meta-directory without the drawbacks FIG. 5 is a flow diagram illustrating a process for providing a hybrid meta-directory for recording a grant of privileges to users. The process begins in block 500 in which a privilege identifier is assigned to each privilege 310 stored in the privilege repository 32, preferably when each privilege 310 is created. Preferably, the privilege identifiers are substantially unique values that are assigned to the privileges 310 by an administrator of the identity management application 12 during a configuration phase of the system.

In block 502, in response to the identity enforcer module 20 granting a privilege 310 to a target user, the privilege identifier assigned to the granted privilege is stored in a record for the target user in the authoritative source domain 30. Preferably, the unique identifier for each privilege 310 granted to each user is stored as a configurable attribute under the user's entry in a LDAP directory 36 (FIG. 1). Thus, the hybrid meta-directory architecture of the exemplary embodiment utilizes the privilege repository 32 as not only a resource store, but also associates granted privileges 310 with the user's login ID in the authoritative source directory 34.

In block 504, in response to receiving a query of the authoritative source domain 34 based on a user ID, the identity management application 12 retrieves a list of privileges granted to the corresponding user based on the privilege identifiers associated with the user ID in the authoritative source domain 34. This list can then be cross-referenced against a table that may contain details about all soft and hard resources 15 the user has access to.

The hybrid meta-directory design has the advantage of being able to store all hard and soft resource privileges with the owner's user account, without storing any user information in the privilege repository 32. A comprehensive asset report can be generated for an individual user without having to query every resource system that the user may belong to as what might be done in the case of a common meta-directory. Using this design enables the application to have the same benefits of having all the relevant information in a single place without having to extend the schema of an existing directory, but is more efficient, easier to manage, and more secure than using a meta-directory.

Another advantage of the hybrid meta-directory design is that if the user's ID changes or needs to be deleted, the user's ID can be changed or deleted in the authoritative source directory 34, alleviating the need for an administrator to search a privilege database to find multiple occurrences of the user's ID and to change or delete them. Another advantage of a hybrid meta-directory is that if the self-service privilege repository becomes corrupted or otherwise inaccessible, a record of the users of privileges is maintained via the authoritative source directory 34.

According to a further embodiment, the identity enforcer module 20 utilizes the hybrid meta-directory design to implement automatic separation of duty detection and compliance. In response to the user initiating a request for a selected privilege 310 by adding it to the request cart 308, the identity enforcer module 20 checks a separation of duty privilege list to determine whether any of the privileges in the request cart 308 conflict with any privilege currently granted to the user by querying the authoritative source domain 34 with the target user's ID to determine which privileges have already been granted to the user and comparing them to the privileges from the separation of duty privilege list. In response to detecting a conflict, the identity enforcer module 20 indicates to the user that the selected privilege cannot be granted concurrently with the conflicting privilege, thereby facilitating compliance with separation of duties requirements of Sarbanes-Oxley.

Figure 6:
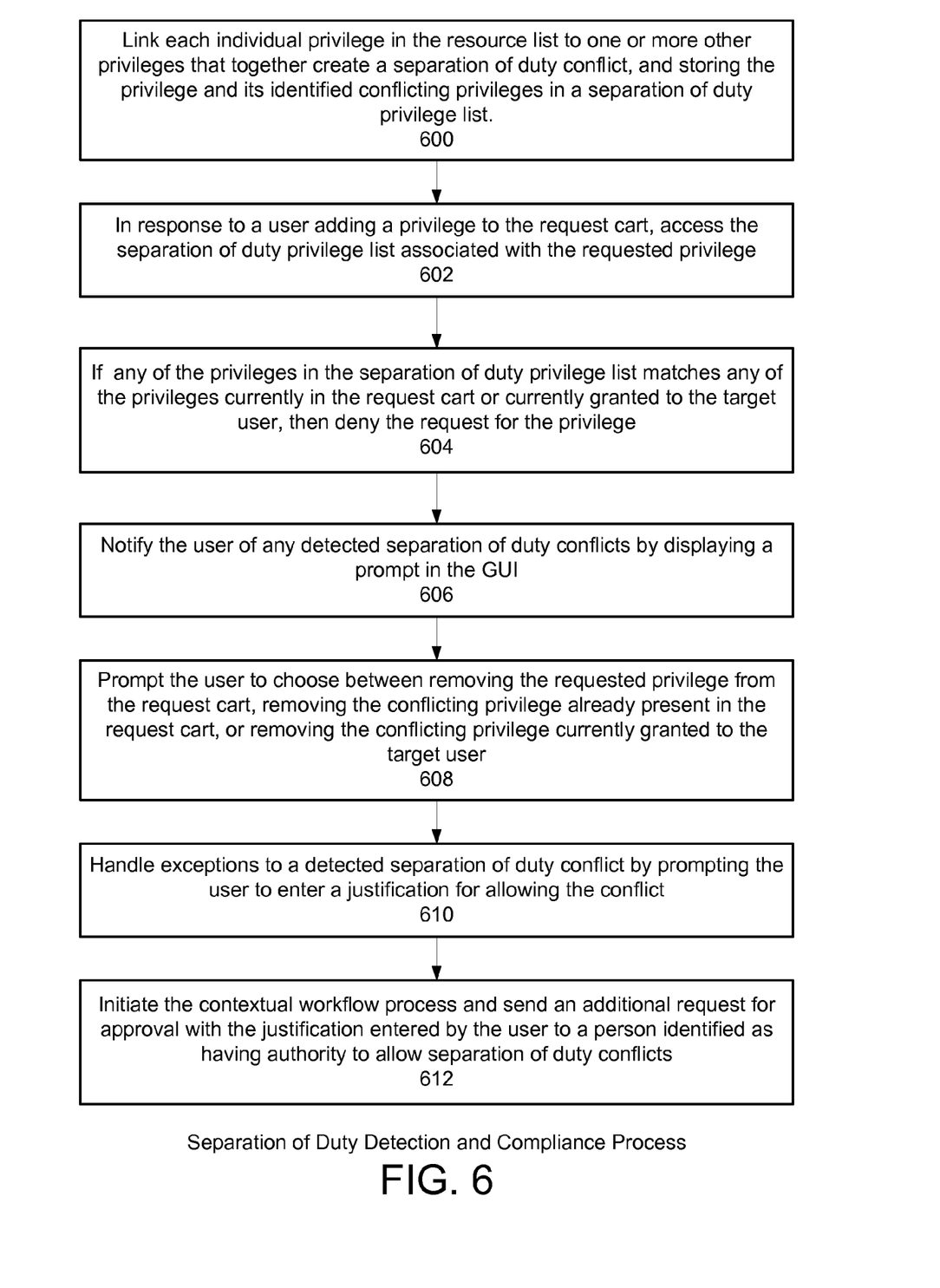
FIG. 6 is a flow diagram illustrating a Sarbanes-Oxley separation of duty detection and compliance process in accordance with the exemplary embodiment.

FIG. 6 is a flow diagram illustrating a Sarbanes-Oxley separation of duty detection and compliance process in accordance with the exemplary embodiment. The process in block 600 by providing a configuration stage of the identity enforcer module 20 that allows an administrator to link individual privileges 310 in the resource list 306 to one or more other privileges 310 that together create a separation of duty conflict, and storing the privilege and its identified conflicting privileges in a separation of duty privilege list (not shown). In one embodiment, respective separation of duty privilege lists may be associated and stored with individual privileges in the privilege repository 32. In another embodiment, respective separation of duty privilege lists may be implemented as records in a separation of duty database.

In block 602, in response to a user adding a privilege 310 to the request cart 308, the identity enforcer module 20 accesses the separation of duty privilege list associated with the requested privilege.

In block 604, if any of the privileges 310 in the separation of duty privilege list matches any of the privileges currently in the request cart 308 or currently granted to the target user, then it is determined that a separation of duty conflict has been detected and the request for the privilege 310 is denied. The identity enforcer module 20 determines whether the selected privilege 310 added to the request cart conflicts with any of the privileges currently granted to the target user by first querying the authoritative source domain 34 with the target user's ID to retrieve a list of privileges granted to the target user. The privileges in the retrieved list are then cross-referenced with the privileges listed in the separation of duty privilege list for the selected privilege.

In block 606, the identity enforcer module 20 notifies the user of any detected separation of duty conflicts by displaying a prompt in the GUI 300. In block 608, the identity enforcer module 20 preferably allows the separation of duty conflict to be cured by prompting the user to choose between removing the requested privilege 310 from the request cart 308, removing the conflicting privilege that is already present in the request cart 308, or having the conflicting privilege currently granted to the target user removed.

If the user does not wish to cure the separation of duty conflict, then according to a further embodiment, the identity enforcer module 20 is configured to handle exceptions to a detected separation of duty conflict in block 610 by prompting the user to enter a justification for allowing the conflict. In block 612, the identity enforcer module 20 initiates the contextual workflow process shown in FIG. 4 (starting with block 402), and as part of the contextual workflow process, sends an additional request for approval with the justification entered by the user to a person identified in the organization/enterprise as having authority to allow separation of duty conflicts.

Thus, according to this aspect of the exemplary embodiment, the identity enforcer module 20 assists in preventing a target user from gaining access to a privilege that they should not by detecting separation of duty conflicts and bringing the separation of duty conflicts to the attention of managers. This mechanism ensures that a person cannot accidentally or purposely gain access to two or more resources 15 or privileges 310 that they should not have simultaneous access based on predefined separation of duty conflicts.

Once all the approvals are received and a request privilege 310 is granted, how the granting of the privilege 310 is actually carried out is based on the type of privilege 310 involved. According to the exemplary embodiment, the actual granting of some types of privileges 310 is performed by the organization/enterprise that owns or controls the associated resource. For example, the granting of payment authorization permission for the privilege "Accounts Receivable" could be performed internally by a system administrator in response to a prompt or message from the identity enforcer module 20, or the permission could be granted automatically by the identity enforcer module 20. With other types of privileges 310, the granting of the privilege 310 may be performed by a third-party. Examples include the granting of a request for business cards, or the granting of a request for a cell phone (resource) with a domestic and international calling plan (the privilege), which may require that orders be placed with outside vendors to procure the items.

A computer-implemented method and system for providing self-service resource provisioning having collaborative compliance enforcement has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be stored in some form of computer-readable medium such as memory or CD-ROM and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We Claim:

1. A computer-implemented method for providing self-service resource provisioning having collaborative compliance enforcement, comprising:

displaying a hierarchical list of resources for selection of at least one of a plurality of privileges associated with the resources;

in response to a user selecting at least one of the privileges from the hierarchical list, adding the selected privilege to a request cart to enable the user to initiate a request for the privilege; and in response to a user submitting the request cart, automatically invoking a workflow process to approve a request for the privilege, wherein the workflow is dynamically generated at least in part from a structure of the hierarchical list of resources and a location of the privilege within the hierarchical list, wherein approval for the request of the privilege is granted by requesting approval from a chain of one or more people associated with the privilege and its corresponding resource as defined by the structure of the hierarchical list;

wherein once the request for the privilege is submitted for a target user, the workflow process initiates a chain of approval by first sending a request for approval to a manager of the target user, then sending respective requests for approval to a manager of the privilege and a manager of the resource to which the privilege is linked in the hierarchical list; and wherein the workflow process is configured such that a countdown timer having a designated duration is associated with each privilege in the hierarchical list, wherein once the request for the privilege is submitted the corresponding countdown timer is started, and as the countdown timer begins to expire, the workflow low process sends approval request reminders at increasingly rapid intervals to the managers who have yet to respond.

2. The method of claim 1 wherein the workflow process associated with each privilege is derived from the location of the privilege in the hierarchical list, such that if the privilege is moved to a different location in the hierarchical list, then the workflow process is automatically changed.

3. The method of claim 2 further including determining if the requested privilege is special such that the privilege requires further approval by a person within a designated position of an organization/enterprise providing the self-provisioning resource process, and if so, then requesting further approval from the person having the designated position associated with granting of the special privilege.

4. The method of claim 3 wherein the request for the privilege is granted or denied based on responses received from the managers.

5. The method of claim 4 further including denying the request for the privilege if any of the managers requested to approve the request for the privilege deny the request, and granting the request for the privilege if each one of the managers requested to approve the request for the privilege approve the request.

6. The method of claim 1 wherein the workflow process sends requests for approvals to the managers using electronic messages.

7. The method of claim 1 wherein the workflow process serially sends each request for approval to the managers based on a hierarchy of the workflow such that a request for approval is not sent out to a manager associated with one level the hierarchical list until a response is received the manager on a next lower-level of the hierarchical list.

8. The method of claim 1 wherein the workflow sends all the requests for approvals to the managers at one time.

9. The method of claim 1 wherein the workflow process allows the user to view a progress of pending workflow processes initiated by the user.

10. The method of claim 1 wherein a privilege comprises at least one of a permission to perform an action with respect to an associated resource, and a grantable attribute of the resource.

11. The method of claim 1 wherein the hierarchal list of resources includes multiple levels of resources, sub-resources, and privileges, wherein privileges occupy leaf nodes of the hierarchical list of resources.

12. The method of claim 1 wherein the hierarchical list of resources is displayed in a graphical user interface comprising a window with two panes, wherein one pane displays the hierarchal list of resources, and a second pane displays the request cart, such that the user can add a particular privilege to the request cart by dragging and dropping the privilege from the hierarchical resource list into the request cart.

13. The method of claim 1 wherein the self-service provisioning process is used by an organization/enterprise, and wherein users of the self-service provisioning process include both members of the organization/enterprise and non-members of the organization/enterprise, wherein the members of the organization/enterprise include at least one of as officers, employees, and contractors, and the non-members include at least one of vendors, customers, and guests.

14. The method of claim 1 wherein the self-service provisioning process is used by an organization/enterprise, and wherein actual granting of the privilege is performed by at least one of the organization/enterprise, and a third-party.

15. An executable software product stored on a computer-readable medium containing program instructions for providing self-service resource provisioning having collaborative compliance enforcement, the program instructions for:
   displaying a hierarchical list of resources for selection of at least one of a plurality of privileges associated with the resources;
   in response to a user selecting at least one of the privileges from the hierarchical list, adding the selected privilege to a request cart to enable the user to initiate a request for the privilege; and
   in response to a user submitting the request cart, automatically invoking a workflow process to approve a request for the privilege, wherein the workflow is dynamically generated at least in part from a structure of the hierarchical list of resources and a location of the privilege within the hierarchical list,
   wherein approval for the request of the privileqe is granted by requesting approval from a chain of one or more people associated with the privilege and its corresponding resource as defined by the structure of the hierarchical list;
   wherein once the request for the privilege is submitted for a target user, the workflow process initiates a chain of approval by first sending a request for approval to a manager of the target user, then sending respective requests for approval to a manager of the privilege and a manager of the resource to which the privilege is linked in the hierarchical list; and
   wherein the workflow process is configured such that a countdown timer having a designated duration is associated with each privilege in the hierarchical list, wherein once the request for the privilege is submitted the corresponding countdown timer is started, and as the countdown timer begins to expire, the workflow process sends approval request reminders at increasingly rapid intervals to the managers who have yet to respond.

16. The executable software product of claim 15 wherein the workflow process associated with each privilege is derived from the location of the privilege in the hierarchical list, such that if the privilege is moved to a different location in the hierarchical list, then the workflow process is automatically changed.

17. The executable software product of claim 16 further including determining if the requested privilege is special such that the privilege requires further approval by a person within a designated position of an organization/enterprise providing the self-provisioning resource process, and if so, then requesting further approval from the person having the designated position associated with granting of the special privilege.

18. The executable software product of claim 17 wherein the request for the privilege is granted or denied based on responses received from the managers.

19. The executable software product of claim 18 further including denying the request for the privilege if any of the managers requested to approve the request for the privilege deny the request, and granting the request for the privilege if each one of the managers requested to approve the request for the privilege approve the request.

20. The executable software product of claim 15 wherein the workflow process sends requests for approvals to the managers using electronic messages.

21. The executable software product of claim 15 wherein the workflow process serially sends each request for approval to the managers based on a hierarchy of the workflow such that a request for approval is not sent out to a manager associated with one level the hierarchical list until a response is received the manager on a next lower-level of the hierarchical list.

22. The executable software product of claim 15 wherein the workflow sends all the requests for approvals to the managers at one time.

23. The executable software product of claim 15 wherein the workflow process allows the user to view a progress of pending workflow processes initiated by the user.

24. The executable software product of claim 15 wherein a privilege comprises at least one of a permission to perform an action with respect to an associated resource, and a grantable attribute of the resource.

25. The executable software product of claim 15 wherein the hierarchal list of resources includes multiple levels of resources, sub-resources, and privileges, wherein privileges occupy leaf nodes of the hierarchical list of resources.

26. The executable software product of claim 15 wherein the hierarchical list of resources is displayed in a graphical user interface comprising a window with two panes, wherein one pane displays the hierarchal list of resources, and a second pane displays the request cart, such that the user can add a particular privilege to the request cart by dragging and dropping the privilege from the hierarchical resource list into the request cart.

27. The executable software product of claim 15 wherein the self-service provisioning process is used by an organization/enterprise, and wherein users of the self-service provisioning process include both members of the organization/enterprise and non-members of the organization/enterprise, wherein the members of the organization/enterprise include at least one of as officers, employees, and contractors, and the non-members include at least one of vendors, customers, and guests.

28. The executable software product of claim 15 wherein the self-service provisioning process is used by an organization/enterprise, and wherein actual granting of the privilege is performed by at least one of the organization/enterprise, and a third-party.

29. A self-service resource provisioning system, comprising:
   a server; and
   an identity management application executing on the server, the identity management application for providing a user with self-service resource provisioning of resources, wherein in response to communication with the user over a network, the identity management application is configured to:
      display a hierarchical list of resources for selection of at least one of a plurality of privileges associated with the resources;
      in response to the user selecting at least one of the privileges from the hierarchical list, add the selected privilege to a request cart to enable the user to initiate a request for the privilege; and
      in response to a user submitting the request cart, automatically invoke a workflow process to approve a request for the privilege, wherein the workflow is dynamically generated at least in part from a structure of the hierarchical list of resources and a location of the privilege within the hierarchical list,
      wherein approval for the request of the privilege is granted by requesting approval from a chain of one or more people associated with the privilege and its corresponding resource as defined by the structure of the hierarchical list;

wherein once the request for the privilege is submitted for a target user, the workflow process initiates a chain of approval by first sending a request for approval to a manager of the target user, then sending respective requests for approval to a manager of the privilege and a manager of the resource to which the privilege is linked in the hierarchical list; and wherein the workflow process is configured such that a countdown timer having a designated duration is associated with each privilege in the hierarchical list, wherein once the request for the privilege is submitted the corresponding countdown timer is started, and as the countdown timer begins to expire, the workflow process sends approval request reminders at increasingly rapid intervals to the managers who have yet to respond.

30. The self-service resource provisioning system of claim 29 wherein the workflow process associated with each privilege is derived from the location of the privilege in the hierarchical list, such that if the privilege is moved to a different location in the hierarchical list, then the workflow process is automatically changed.

31. The self-service resource provisioning system of claim 30 further including determining if the requested privilege is special such that the privilege requires further approval by a person within a designated position of an organization/enterprise providing the self-provisioning resource process, and if so, then requesting further approval from the person having the designated position associated with granting of the special privilege.

32. The self-service resource provisioning system of claim 31 wherein the request for the privilege is granted or denied based on responses received from the managers.

33. The self-service resource provisioning system of claim 32 further including denying the request for the privilege if any of the managers requested to approve the request for the privilege deny the request, and granting the request for the privilege if each one of the managers requested to approve the request for the privilege approve the request.

34. The self-service resource provisioning system of claim 29 wherein the workflow process sends requests for approvals to the managers using electronic messages.

35. The self-service resource provisioning system of claim 29 wherein the workflow process serially sends each request for approval to the managers based on a hierarchy of the workflow such that a request for approval is not sent out to a manager associated with one level the hierarchical list until a response is received the manager on a next lower-level of the hierarchical list.

36. The self-service resource provisioning system of claim 29 wherein the workflow sends all the requests for approvals to the managers at one time.

37. The self-service resource provisioning system of claim 29 wherein the workflow process allows the user to view a progress of pending workflow processes initiated by the user.

38. The self-service resource provisioning system of claim 29 wherein a privilege comprises at least one of a permission to perform an action with respect to an associated resource, and a grantable attribute of the resource.

39. The self-service resource provisioning system of claim 29 wherein the hierarchal list of resources includes multiple levels of resources, sub-resources, and privileges, wherein privileges occupy leaf nodes of the hierarchical list of resources.

40. The self-service resource provisioning system of claim 29 wherein the hierarchical list of resources is displayed in a graphical user interface comprising a window with two panes, wherein one pane displays the hierarchal list of resources, and a second pane displays the request cart, such that the user can add a particular privilege to the request cart by dragging and dropping the privilege from the hierarchical resource list into the request cart.

41. The self-service resource provisioning system of claim 29 wherein the self-service provisioning process is used by an organization/enterprise, and wherein users of the self-service provisioning process include both members of the organization/enterprise and non-members of the organization/enterprise, wherein the members of the organization/enterprise include at least one of as officers, employees, and contractors, and the non-members include at least one of vendors, customers, and guests.

42. The self-service resource provisioning system of claim 29 wherein the self-service provisioning process is used by an organization/enterprise, and wherein actual granting of the privilege is performed by at least one of the organization/enterprise, and a third-party.

43. A self-service resource provisioning system, comprising:

means for displaying a hierarchical list of resources for selection of at least one of a plurality of privileges associated with the resources;

means responsive to a user selecting at least one of the privileges from the hierarchical list for adding the selected privilege to a request cart to enable the user to initiate a request for the privilege; and means responsive to a user submitting the request cart for automatically invoking a workflow process to approve a request for the privilege, wherein the workflow is dynamically generated at least in part from a structure of the hierarchical list of resources and a location of the privilege within the hierarchical list, wherein approval for the request of the privilege is granted by requesting approval from a chain of one or more people associated with the privilege and its corresponding resource as defined by the structure of the hierarchical list;

wherein once the request for the privilege is submitted for a target user, the workflow process initiates a chain of approval by first sending a request for approval to a manager of the target user, then sending respective requests for approval to a manager of the privilege and a manager of the resource to which the privilege is linked in the hierarchical list; and wherein the workflow process is configured such that a countdown timer having a designated duration is associated with each privilege in the hierarchical list, wherein once the request for the privilege is submitted the corresponding countdown timer is started, and as the countdown timer begins to expire, the workflow process sends approval request reminders at increasingly rapid intervals to the managers who have yet to respond.

* * * * *